US012430179B2

(12) United States Patent
Chatterjee (10) Patent No.: US 12,430,179 B2
(45) Date of Patent: Sep. 30, 2025

(54) DISTRIBUTION OF A WORKLOAD AMONG NODES OF A SYSTEM WITH A NUMA ARCHITECTURE

(71) Applicant: Advanced Micro Devices, Inc., Santa Clara, CA (US)

(72) Inventor: Aditya Chatterjee, Bangalore (IN)

(73) Assignee: Advanced Micro Devices, Inc., Santa Clara, CA (US)

( * ) Notice: Subject to any disclaimer, the term of this patent is extended or adjusted under 35 U.S.C. 154(b) by 612 days.

(21) Appl. No.: 17/863,247

(22) Filed: Jul. 12, 2022

(65) Prior Publication Data

US 2024/0020173 A1 Jan. 18, 2024

(51) Int. Cl.
*G06F 9/50* (2006.01)
*G06F 9/445* (2018.01)

(52) U.S. Cl.
CPC .......... *G06F 9/505* (2013.01); *G06F 9/44505* (2013.01); *G06F 9/5072* (2013.01)

(58) Field of Classification Search
CPC ....................................................... G06F 9/50
See application file for complete search history.

(56) References Cited

U.S. PATENT DOCUMENTS 8,898,146 B2 * 11/2014 Castellanos ....... G06F 16/24532
707/718
2022/0405289 A1 * 12/2022 Beier ................... G06F 16/258

* cited by examiner

*Primary Examiner* — Charlie Sun
(74) *Attorney, Agent, or Firm* — Volpe Koenig (57) ABSTRACT

Methods and systems are disclosed for distribution of a workload among nodes of a NUMA architecture. Techniques disclosed include receiving the workload and data batches, the data batches to be processed by the workload. Techniques disclosed further include assigning workload processes to the nodes according to a determined distribution, and, then, executing the workload according to the determined distribution. The determined distribution is selected out of a set of distributions, so that the execution time of the workload, when executed according to the determined distribution, is minimal.

20 Claims, 5 Drawing Sheets

DISTRIBUTION OF A WORKLOAD AMONG NODES OF A SYSTEM WITH A NUMA ARCHITECTURE

BACKGROUND

A non-uniform memory access (NUMA) architecture is a computer architecture where multiple nodes can access each other's memory system. In such an architecture, a memory system on one node can be accessed by processes of a workload running on other nodes, which may significantly affect overall system performance. To maximize performance of a workload running on a system with a NUMA architecture, the optimal distribution of the workload across the NUMA nodes should be determined. That is, for example, the number of workload processes, namely process which form part of the workload, to employ, on what nodes, and what portion of the workload's input data each process should operate on. Depending on the number of nodes and input data size, searching exhaustively (in a brute force approach) for an optimal distribution is not practical (may take too long).

BRIEF DESCRIPTION OF THE DRAWINGS

A more detailed understanding may be had from the following description, given by way of example in conjunction with the accompanying drawings wherein.

DETAILED DESCRIPTION

Techniques are needed to efficiently determine an improved distribution of a workload in a system with a NUMA architecture within a more manageable timeframe Systems and methods are disclosed herein that determine such an improved distribution for a workload to be processed in a system with a NUMA architecture. Aspects described herein use a graph-based approach to determine the distribution of the workload. Further aspects described herein apply dynamic programming to determine the distribution of the workload.

Aspects of the present disclosure describe methods for a distribution of a workload among nodes of a NUMA architecture. The methods include receiving the workload and data batches, the data batches to be processed by the workload. The methods further include assigning workload processes to the nodes according to a determined distribution, and, then, executing the workload according to the determined distribution. The determined distribution is selected out of a set of distributions, so that the execution time of the workload, when executed according to the distribution, is minimal.

Aspects of the present disclosure also describe systems for a distribution of a workload among nodes of a NUMA architecture. The systems include at least one processor and memory storing instructions. The instructions, when executed by the at least one processor, cause the systems to receive the workload and data batches, the data batches to be processed by the workload. The instructions further cause the systems to assign workload processes to the nodes according to a determined distribution, and, then, to execute the workload according to the determined distribution. The determined distribution is selected out of a set of distributions, so that the execution time of the workload, when executed according to the distribution, is minimal.

Further aspects of the present disclosure describe a non-transitory computer-readable medium comprising instructions executable by at least one processor to perform methods for a distribution of a workload among nodes of a NUMA architecture. The methods include receiving the workload and data batches, the data batches to be processed by the workload. The methods further include assigning workload processes to the nodes according to a determined distribution, and, then, executing the workload according to the determined distribution. The determined distribution is selected out of a set of distributions, so that the execution time of the workload, when executed according to the distribution, is minimal.

Figure 1:
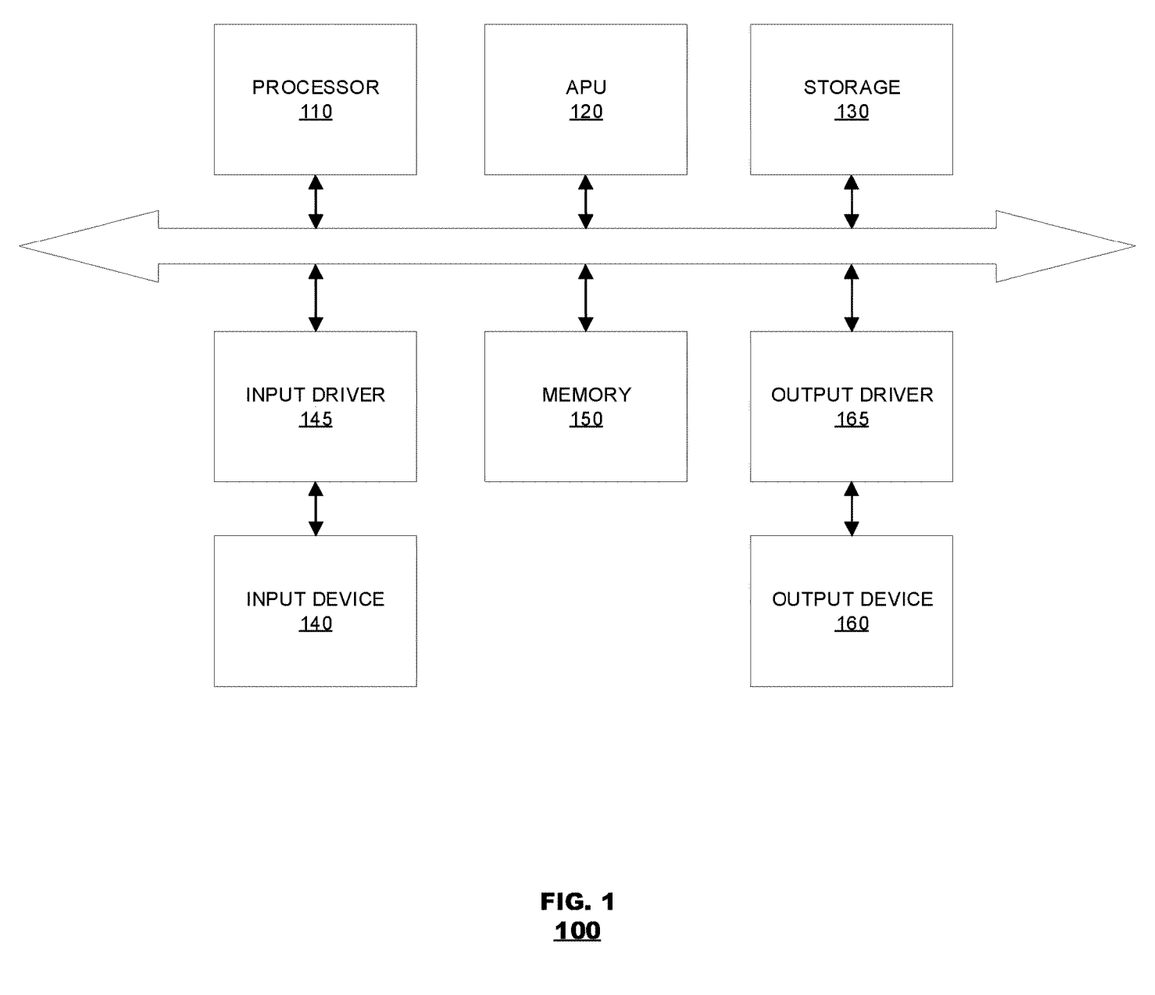
FIG. 1 is a block diagram of an example device, based on which one or more features of the disclosure can be implemented.

FIG. 1 is a block diagram of an example device 100, based on which one or more features of the disclosure can be implemented. The device 100 can be, for example, a computer, a gaming device, a handheld device, a set-top box, a television, a mobile phone, or a tablet computer. The device 100 can include a processor 110, an accelerated processing unit (APU) 120, storage 130, an input device 140, memory 150, and an output device 160. The device 100 can also include an input driver 145 and an output driver 165. The processor 110 and the APU 120 can represent one or more cores of central processing units (CPUs) and one or more cores of APUs, respectively. The memory 150 can represent volatile or non-volatile memory, including random-access memory (RAM), SRAM, dynamic random-access (DRAM), a cache, or a combination thereof. The processor 110, the APU 120, and the memory 150, or a subset thereof, may be located on the same die or on separate dies. In an aspect, the device 100 can include additional components not shown in FIG. 1.

The APU 120 can represent a graphics processing unit (GPU), that is, a shader system comprising one or more parallel processing units that are configured to perform computations, for example, in accordance with a single instruction multiple data (SIMD) paradigm. The APU 120 can be configured to accept compute commands and graphics rendering commands from the processor 110, to process those compute and graphics rendering commands, and/or to provide output to a display (the output device 160).

The storage 130 can include fixed or removable storage, for example, a hard disk drive, a solid-state drive, an optical disk, or a flash drive. The input device 140 can represent, for example, a keyboard, a keypad, a touch screen, a touch pad, a detector, a microphone, an accelerometer, a gyroscope, a biometric scanner, or a network connection (e.g., a wireless local area network card for receipt of wireless IEEE 802 signals). The output device 160 can represent, for example, a display, a speaker, a printer, a haptic feedback device, one or more lights, an antenna, or a network connection (e.g., a wireless local area network card for transmission of wireless IEEE 802 signals). In an aspect, the input driver 145 communicates with the processor 110 (or the APU 120) and the input device 140, and facilitates the receiving of input from the input device 140 to the processor 110 (or the APU 120). In another aspect, the output driver 165 communicates with the processor 110 (or the APU 120) and the output device 160, and facilitates the sending of output from the processor 110 (or the APU 120) to the output device 160.

Figure 2:
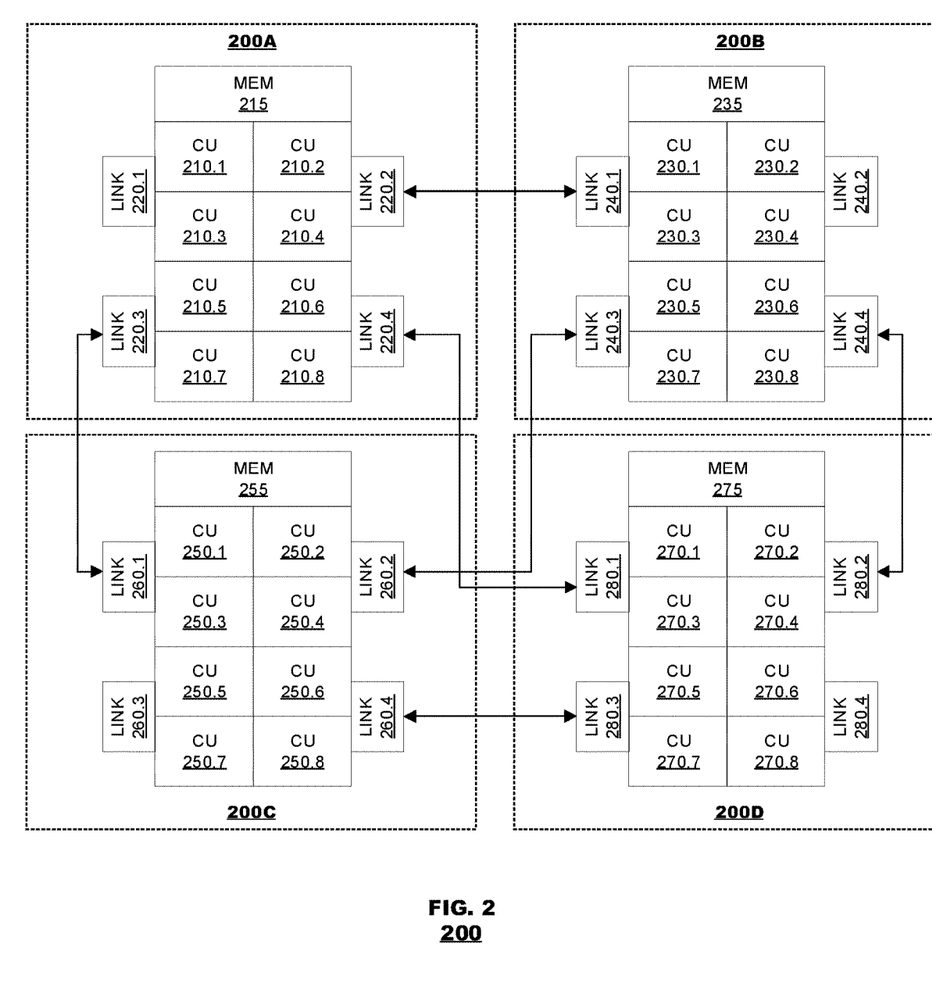
FIG. 2 is a block diagram of an example system with a NUMA architecture, based on which one or more features of the disclosure can be implemented.

FIG. 2 is a block diagram of an example system 200 with a NUMA architecture, based on which one or more features of the disclosure can be implemented. The system 200 may be part of the processor 110 or the APU 120 of FIG. 1. The system 200 demonstrates a NUMA architecture of four nodes 200A-D. Each NUMA node (e.g., 200A) includes computing units (CU) (e.g., 210.1-8), a memory system (e.g., 215), and links (e.g., 220.1-4). The memory systems 215, 235, 255, 275 may include a cache system and volatile memory units. The links 220, 240, 260, 280, provide each node access to another node's memory system. Thus, each NUMA node, in addition to locally accessing its own memory system, can remotely access the memory systems of other nodes, and, thereby, extend the total memory space available to it. Yet, remote memory access is not as efficient as local memory access—as when a computing unit of one node (e.g., 200A) remotely accesses a memory system of another node (e.g., 200D), data are exchanged across respective links (e.g., 220.4 and 280.1). However, when running a workload that processes large amounts of data—such as a deep neural network (DNN)—it may be advantageous to distribute the data and the data processing into several nodes.

System 200 may execute a workload implementing a machine learning module, such as a DNN. The machine learning module can be implemented in hardware, software, or a combination of both. The machine learning module can also be implemented in machine learning module circuitry. Typically, a DNN is first executed in a training mode, where the network parameters are tuned based on training data. Following training, a trained DNN can be employed in an inference mode to perform operations (such as classification, detection, or prediction operations) on input data. The input data contain a number of data batches, such as images, denoted B, that can be processed concurrently by the DNN workload (e.g., B=256 images). The performance of the system 200 can be determined by its throughput, for example, the number of images that can be processed in a second. By executing the workload by several processes, so that each process operates on a smaller number of data batches (e.g., 128 or 64), the throughput can be maximized.

A DNN workload is typically configured by a framework (e.g., software modules). Setting the framework's parameters, one can determine the degree of parallelism—that is, the number of threads a workload process employs to carry out the data processing. An example framework is the TensorFlow DL framework in combination with one DNN or ZenDNN (used for machine learning and vector arithmetic optimizations) and OpenMP (used to execute code segments in parallel). This framework can be configured by a parameter that determines the degree of parallelism with respect to the data processing, denoted $N_{inter-threads}$, by a parameter that determines the degree of parallelism within an operation (such as convolution), denoted $N_{intra-threads}$, or, alternatively, by a parameter that determines the overall degree of parallelism $N_{omp-threads}$.

Using a NUMA architecture to execute a workload—that is, running multiple processes that operate on respective data batches—requires efficient distribution of the processes across the NUMA nodes. Such a distribution can be represented by triplets. A triplet is defined herein as follows:

$$d_i=(b_i,n_i,t_i). \quad (1)$$

where, $d_i$ denotes a triplet of a process i, $b_i$ denotes the batch size that process i operates on, $n_i$ denotes a NUMA node configuration, and $t_i$ denotes the time it takes to execute process i when the process operates on a batch size $b_i$ according to a configuration $n_i$. The NUMA node configuration $n_i$ is represented by a binary number, where each binary bit indicates whether a corresponding NUMA node is used for the execution of process i—that is, "1" indicates that the respective NUMA node is used and "0" indicates that the respective NUMA node is not used. For example, with respect to nodes 200A-B, $n_i$=1010 indicates that nodes 200A and 200C are used while nodes 200B and 200D are not used.

For example, a workload that has to process a batch of 256 images, B=256, on a NUMA architecture that consists of four NUMA nodes, N=4 (as illustrated in FIG. 2) can be executed according to the following distribution. A first process can be assigned to the first 200A and the second 200B nodes to process 128 images (e.g., the process' threads may be distributed to run on the first and on the second nodes). A second and a third process can be assigned to the third 200C and fourth 200D nodes, respectively, to each process 64 images. Such a distribution can be represented by D={$d_1$, $d_2$, $d_3$}, where:

$$d_1=(b_1,n_1,t_1)=(128,1100,t_1) \quad (2)$$

$$d_2=(b_2,n_2,t_2)=(64,0010,t_2) \quad (3)$$

$$d_3=(b_3,n_3,t_3)=(64,0001,t_3). \quad (4)$$

Note that in a distribution D, $b_1+b_2+b_3$ should be equal to B (the workload's batch size), that, in this case, is the 256 images. Additionally, D should be a valid distribution, meaning its node configurations $n_1$, $n_2$, and $n_3$ should be compatible. As defined herein, compatible NUMA node configurations do not have overlapping used nodes, that is, no corresponding bits of $n_i$ and $n_j$ can be equal to "1". The workload execution time, T, is a function of $t_1$, $t_2$, and $t_3$, that is, T=F($t_1$, $t_2$, $t_3$). For example, if the processes associated with the distribution D run in parallel and have no overlapping NUMA nodes in use, then T=maximum($t_1$, $t_2$, $t_3$). However, if the NUMA nodes are shared between the processes, so that, for example, the first and the second processes run sequentially, then T=maximum($t_1+t_2$, $t_3$). In an aspect, for improved performance, the NUMA nodes of a distribution D are not shared, and so the respective workload execution time is T=maximum($t_1$, $t_2$, $t_3$).

In another example, the same workload can be distributed for execution according to a distribution where four processes are assigned to four respective NUMA nodes to each process 64 images (out of the 256 images). Such a distribution can be represented by D={$d_1$, $d_2$, $d_3$, $d_4$}, where:

$$d_1=(b_1,n_1,t_1)=(64,1000,t_1), \quad (5)$$

$$d_2=(b_2,n_2,t_2)=(64,0100,t_2), \quad (6)$$

$$d_3=(b_3,n_3,t_3)=(64,0010,t_3), \quad (7)$$

$$d_4=(b_4,n_4,t_4)=(64,0001,t_4). \quad (8)$$

As in the previous example, B=$b_1+b_2+b_3+b_4$=256, and $n_1$, $n_2$, $n_3$, and $n_4$ should be compatible (no corresponding bits of $b_i$ and $b_j$ can be both "1"). The workload execution time in this case is T=maximum($t_1$, $t_2$, $t_3$, $t_4$), as the four processes associated with this distribution run in parallel in separate NUMA nodes.

To find the distribution that results in the most efficient performance for a given workload, namely, distribution $\hat{D}$ or an improved distribution, a search should be conducted within the set of all possible M triplets, denoted {$d_1$, ..., $d_M$}, for a distribution $\hat{D}$ that yields the minimal execution time T. That is, a subset $\hat{D}$={$d_1$, ..., $d_m$} should be found for which m≤N, $\Sigma_{j=1}^{m} b_j = B$, {$n_1$, ..., $n_m$} are compatible, and the execution time $$T = \max_{j=1:m}$$

$t_j$ is minimal. Searching for the distribution $\hat{D}$, if performed by an exhaustive search may be impractical, since exhaustively searching for the distribution $\hat{D}$ is an optimization problem with a complexity that increases exponentially with the number of NUMA nodes. For example, 136,580,095 possible distributions exist for a batch size of 512 images and for an architecture with four NUMA nodes (i.e., B=512 and N=4).

Generally, in a brute force approach for finding the distribution $\hat{D}$, a set including all possible $2^N$ combination of NUMA node configurations is generated. Next, all subsets of that set that contain compatible NUMA node configurations are extracted. Then, for each possible split of the batch size B, the execution time is computed. For example, for a subset of compatible node configurations such as {1000,0100}, a batch size of B=256 may be split as follows: {(64, 1000, $t_1$),(192, 0100, $t_2$)} or {(128, 1000, $t_1$),(128, 0100, $t_2$)}. The subset of compatible node configurations (and its respective batch size split) that yields the minimal execution time, $$T = \max_{j=1:m} t_j,$$

is selected as the distribution $\hat{D}$. Such an exhaustive search for the distribution $\hat{D}$ results in a complexity of $O(B^{2^N})$. A graph-based approach for determining the distribution D (as described herein in reference to FIG. 3) can reduce that complexity to $O(B^2 \cdot N \cdot 2^N)$. Moreover, utilizing dynamic programming (as described herein in reference to FIG. 4) can further reduce the complexity to $O(B \cdot 2^N)$. In an aspect, the graph-based approach and the use of dynamic programming to determine the distribution $\hat{D}$ of a workload can be done with respect to a reduced set of triplets, as explained further below.

To simplify the problem of finding the distribution $\hat{D}$, the number of triplets that are considered can be reduced into a smaller set, referred to herein as a disjoint set of triplets. In this case, one process can be executed in each node, and, thus, the number of processes can be up to N, the number of the NUMA nodes. Accordingly, a process that runs on one NUMA node will have the same execution time when running on any other of the NUMA nodes, given that the data it processes are accessed in the same manner. For example, a process that locally accesses the data it processes will have the same execution time when running on each of the NUMA nodes 200A-D. And, so, only one NUMA node configuration needs to be considered out of the four configurations: 1000, 0100, 0010, and 0001. Similarly, the execution time of a process that runs on nodes 200A and 200B is the same as when running on nodes 200C and 200D. And, so, only one NUMA node configuration need to be considered out of the two configurations: 1100 and 0011. Moreover, configurations that describe a process running on three nodes (that is, 0111, 1110, 1101, and 1011) or running on diagonally positioned two nodes (0101 and 1010) can be avoided as the time execution in such configurations is longer than the other configurations (due to longer access times between nodes that are diagonally positioned, such as 200A and 200D). For example, for a batch size of 512 images, B=512, and an architecture with four NUMA nodes, N=4, a disjoint set of triplets includes only 7680 triplets (relative to 136,580,095 in the general case).

In an aspect, a disjoint set of triplets, $D_{Disjoint}$, may be formed as follows. NUMA nodes configurations are determined—e.g., five node configurations such as 1000, 1100, 1110, 1111, and 1010. Based on experimentations, framework parameters may also be determined—e.g., $N_{inter-threads}$=1, 2, or 3, $N_{intra-threads}$=32 or 64, and $N_{omp-threads}$=32 or 64. Thus, in this case, for a batch size of B=512, the $D_{Disjoint}$ set includes 30,720 triplets (a result of 512~5·3·2·2 combinations). Next, an execution time $t_i$ is measured for each triplet $d_i$=($b_i$, $n_i$, $t_i$) in the set $D_{Disjoint}$={$d_1$, ..., $d_{30,720}$}. This is accomplished by executing the workload according to each triplet. For example, with respect to a triplet $d_i$=(64, 1000, $t_i$)—that corresponds to framework parameters $N_{inter-threads}$=1, $N_{intra-threads}$=32 and $N_{omp-threads}$=32—the workload will be executed by a process (generated by these framework parameters) that operates on a batch size of 64 using a first node (e.g., node 200A). The resulting execution time is then recorded in the respective $t_i$. Once, the set $D_{Disjoint}$ is formed, the distribution $\hat{D}$ (a subset of $D_{Disjoint}$) can be searched for, applying a graph (FIG. 3) and dynamic programing (FIG. 4), as further described below.

Figure 3:
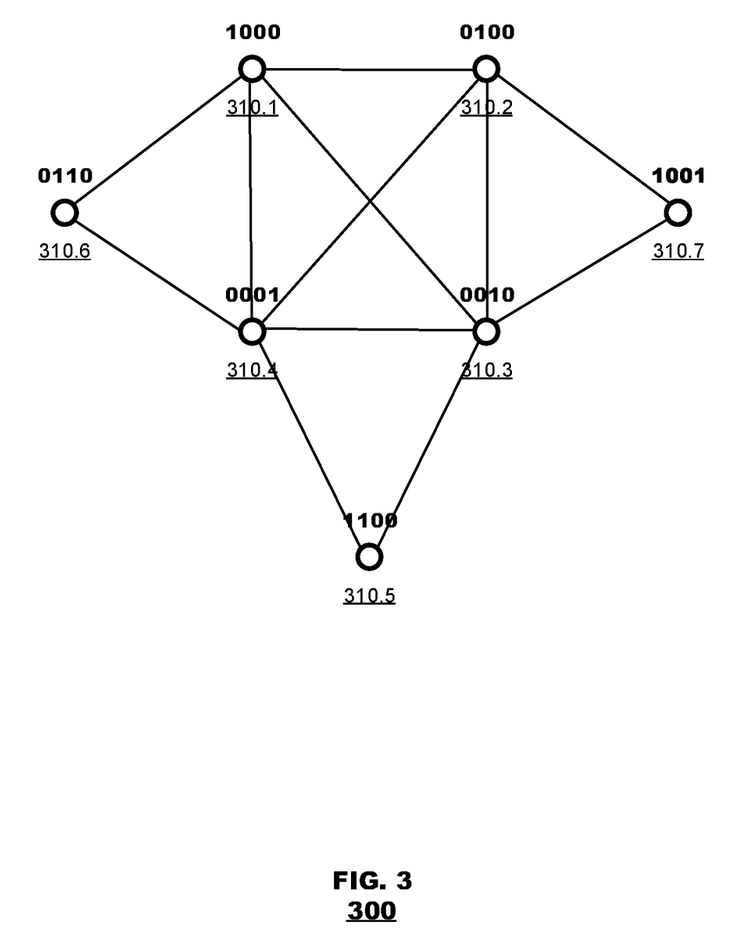
FIG. 3 illustrates a graph for workload distribution optimization, based on which one or more features of the disclosure can be implemented.

FIG. 3 illustrates a graph 300 for workload distribution optimization, based on which one or more features of the disclosure can be implemented. Each node 310 in the graph is associated with a NUMA node configuration and its corresponding triplets. For example, node 310.1 is associated with configuration "1000" and corresponding triplets $d_i$=($b_i$, 1000, $t_i$) from the $D_{Disjoint}$ set that is generated as explained above. Each edge of the graph connects two nodes if their associated NUMA node configurations are compatible. In looking for distribution $\overline{D}$, a path in the graph is searched that includes up to N nodes that are all compatible with each other. For example, the path that includes nodes 310.6, 310.4, and 310.5 is not a valid distribution as node 310.6 (0110) and node 310.5 (1100) are not compatible, while the path that includes nodes 310.1, 310.2, 310.3, and 310.4 is a valid distribution as these nodes are all compatible.

Searching for the improved distribution can then be performed as follows. Starting from node 310.1 (associated with node configuration 1000), the graph can be traversed to any connected node, for example, node 310.3 (associated with node configuration 0010 that is compatible with node 310.1). At this point, a first set of triplets that corresponds to $d_i$=($b_i$, 1000, $t_i$) and a second set of triplets that corresponds to $d_i$=($b_i$, 0010, $t_i$) from the $D_{Disjoint}$ set are examined, looking for a pair of triplets, one from each set, for which the total batch sizes is B and the total execution time is minimal (e.g., $d_k$=(64, 1000, $t_k$) and $d_l$=(192, 0010, $t_l$) with minimal execution time $T_1$=maximum($t_k$, $t_l$). The graph is then traversed further to another connected node, for example, node 310.4 (associated with node configuration 0001 that is compatible with the previous two nodes 310.1 and 310.3). At this point, a third set of triplets that corresponds to $d_i=(b_i, 0001, t_i)$ from the $D_{Disjoint}$ set is examined, looking for a triplet from each of the first, second, and third sets for which the total batch sizes is B and the total execution time is minimal (e.g., $d_k=(64, 1000, t_k)$, $d_l=(128, 0010, t_l)$, and $d_q=(64, 0001, t_q)$ with minimal execution time $T_2=\text{maximum}(t_k, t_l, t_q)$. Then, if $T_2<T_1$ traversing may continue from the current node 310.4 to another compatible node in the graph. Otherwise, traversing may continue from the previous node 310.3 to another compatible node in the graph.

Traversing the graph as demonstrated above is an operation with complexity of $O(B^2 \cdot N \cdot 2^N)$. This is a reduced complexity relative to the brute force approach that, as mentioned above, results in complexity of $O(B^{2^N})$. As disclosed herein, the complexity of finding an improved workload distribution can be further reduced to a complexity of $O(B \cdot 2^N)$ when utilizing dynamic programing to determine the improved workload distribution. Generally, dynamic programming is a technique where the overall problem is broken into sub-problems, so that a solution for the overall problem makes use of solutions for the sub-problems. As disclosed herein, dynamic programming is applied herein to optimize a workload distribution in a system 200 with a NUMA architecture.

Figure 4:
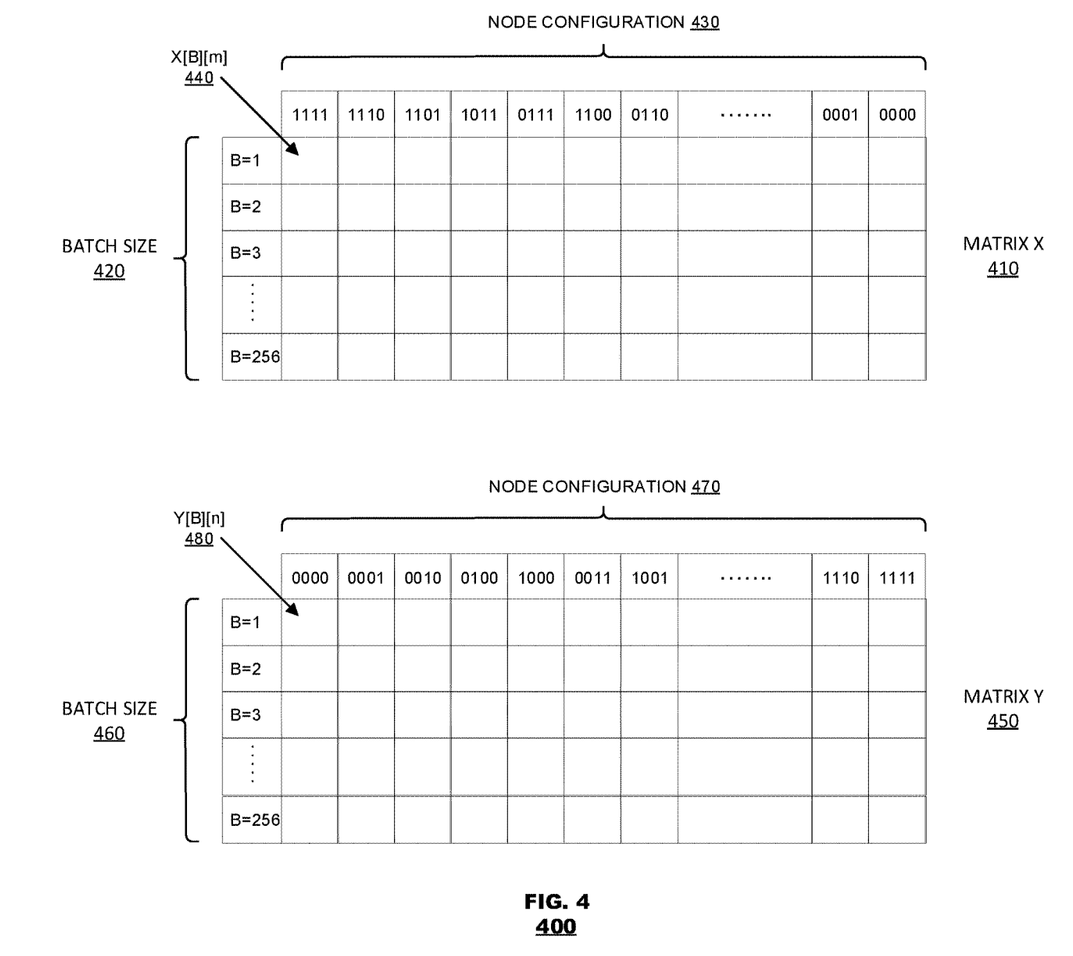
FIG. 4 illustrates dynamic programing data structures for workload distribution optimization, based on which one or more features of the disclosure can be implemented.

FIG. 4 illustrates dynamic programing data structures 400 for workload distribution optimization, based on which one or more features of the disclosure can be implemented. A first data structure includes matrix X 410 and a second data structure includes matrix Y 450. A row in both matrices 410, 450 corresponds to a batch size B to be processed by the workload. The columns of matrix X 410 correspond to NUMA node configurations arranged in a decreasing order, as demonstrated for the case of N=4 that includes 16 configurations 430. Thus, an element X[B][m] 440 of matrix X 410 records the best time achievable with a batch size B and a node configuration m, where m is an N-bit binary data where "1" denotes that the corresponding node cannot be used (a blocked node). The columns of matrix Y 450 correspond to NUMA node configurations arranged in an increasing order, as demonstrated for the case of N=4 that includes 16 configurations 470. Thus, an element Y[B][n] 480 of matrix Y 450 records the time achieved with batch size B and a node configuration n, where n is an N-bit binary data where "1" denotes that the corresponding node is used. Note that the first column of X, of matrix elements X[B][1111], is set to INF (a very large number) because m=1111 indicates that all nodes are blocked. Likewise, the first column of Y, of matrix elements Y[B][0000], is set to INF because n=0000 indicates that none of the nodes are being used.

In a first step of employing dynamic programming for workload distribution optimization, Y 450 is populated with execution times. The Y array can be populated based on the disjoint set of triplets, $D_{Disjoint}$, for which execution times are computed as described above. Note that the execution times need not be computed for all the elements of Y. For example, with respect to a triplet $d_i=(64, 1000, t_i)$ of $D_{Disjoint}$, the respective execution time $t_i$ can be used to populate Y[64][1000], Y[64][0100], Y[64][0010], and Y[64][0001]. Likewise, with respect to a triplet $d_i=(96, 1010, t_i)$ of $D_{Disjoint}$, the respective execution time $t_i$ can be used to populate Y[96][1010], Y[96][0110], Y[96][0101], and Y[96][1001]. In an aspect, some elements of Y can be excluded as their respective execution times need not be computed, for example, elements Y[B][1110], Y[B][0111], Y[B][1101], and Y[B][1011] can be set to INF. This is because the respective execution times of some of the elements of Y may not be likely to be an improved execution time.

Next, for each NUMA configuration, n, a list L is constructed that stores combinations of the used nodes in that NUMA configuration. For example, for n=1011, the list L(n) includes subsets of the enabled first, third and fourth nodes, that is, L(n)={1000, 1010, 1001, 1011, 0010, 0011, 0001}.

Note that the graph 300 of FIG. 3 is structurally equivalent to matrix Y 450 and to the lists of configuration nodes, L(n). In general, a graph can be represented by an adjacency matrix, where each element of such a matrix records a connection—that is, an element A(i,j) indicates whether nodes i and j are connected. However, as disclosed herein, the nodes of graph 300 are each corresponds to multiple batch sizes, and, thus, its representation is different from the standard adjacency matrix. Herein, each column of matrix Y is an array that is associated with a node of the graph 300 and that is indexed by the batch size 460. Thus, Y can represent the graph's nodes and respective data (batch sizes), but Y does not capture the connections among these nodes. To capture the connections, the lists of L[n] can be used. For a given NUMA node configuration, n, the nodes that are not present in the respective list L(n) are connected by edges of the graph 300, as such nodes are compatible (they have no conflicting nodes in use). Using matrix Y 450 and the lists of L(n) simplifies the operation of traversing the graph 300 (as described in reference to FIG. 3) through the computation of matrix X 410, as described below.

To facilitate optimization, X 410 is next computed based on Y 450 and the lists of L of respective NUMA configurations. X is calculated as follows:

$$X[B][m]=\min(\max(X[B-b][p], Y[b][n])), \quad (9)$$

Where $n=L[\overline{m}]$ ($\overline{m}$ is the bitwise NOT of m, containing bits that indicate used nodes), $p=m|n$ (the bitwise OR between m and n), and $\overline{p}$ compatible with n. Note that the computation of X[B][m] uses precomputed terms X[B−b][p] and Y[b][n]. Once X is computed, the distribution for a workload with a batch size B can be found in X[B][m*]. For example, if all the nodes are available to run the workload on, m*=0000 (i.e., none of the nodes are blocked). Ideally, Machine Learning workloads run on dedicated servers to reduce issues with performance. However, there may be a case where the server is shared, and so another process may be using the first node. Or, there may be a case where the first node is reserved for a process of another workload. In such cases, only the second, third, and fourth nodes are available, and so m*=1000.

Referring to equation (9), X[B][m] records the minimum execution time to run a workload with a batch size B using any combination of nodes that are not blocked according to configuration m. Similarly, X[B−b][p] records the minimum execution time to run a workload with a batch size B−b using any combination of nodes that are not blocked according to configuration p. As B−b is less than B, when computing X[B][m], the value of X[B−b][p] is already computed and ready for use. Y[b][n] is the minimum execution time to run a workload of a batch size b as a single process using configuration n. Hence, an element of matrix Y 450, Y[B][n], represents an execution time when running a single process, operating on batch size B, and using a respective configuration n. While, an element of matrix X 410, X[B][m], represents an execution time when running multiple processes each operating on a subset of B and using an available configuration (that is, a configuration that is not blocked as specified by m).

Computing the matrix X proceeds in an increasing order of B—X[1][m], X[2][m], X[3][m], . . . X[256][m]. For example, for B=1, X[1][m]=min(Y[1][n]). That is, the minimal Y[1][n] is searched, where n=L[m̄] is determined for each of the m configurations 430. For B=2, b can be 1 or 2, and, so, the better result is recorded in X[2][m] between min(max(X[1][p], Y[1][n])) and min(max(X[0][p], Y[2][n])). Note that X[B=0][p]=0 because B=0 means that no data are being processed. Next, for B=3, b can be 1, 2, or 3, and, so, the best result is recorded in X[3][m] among min(max(X[2][p], Y[1][n])), min(max(X[1][p], Y[2][n])), and min(max(X[0][p], Y[3][n])). Accordingly, the distribution D̂ for a workload of B=1, B=2, or B=3, is recorded, respectively, in X[1][0000], X[2][0000], and X[3][0000].

The matrixes described above are an example of a data structure for workload distribution optimization. The values used for determining the workload distribution can be stored in any data structure that allows for the storing of a plurality of values.

Figure 5:
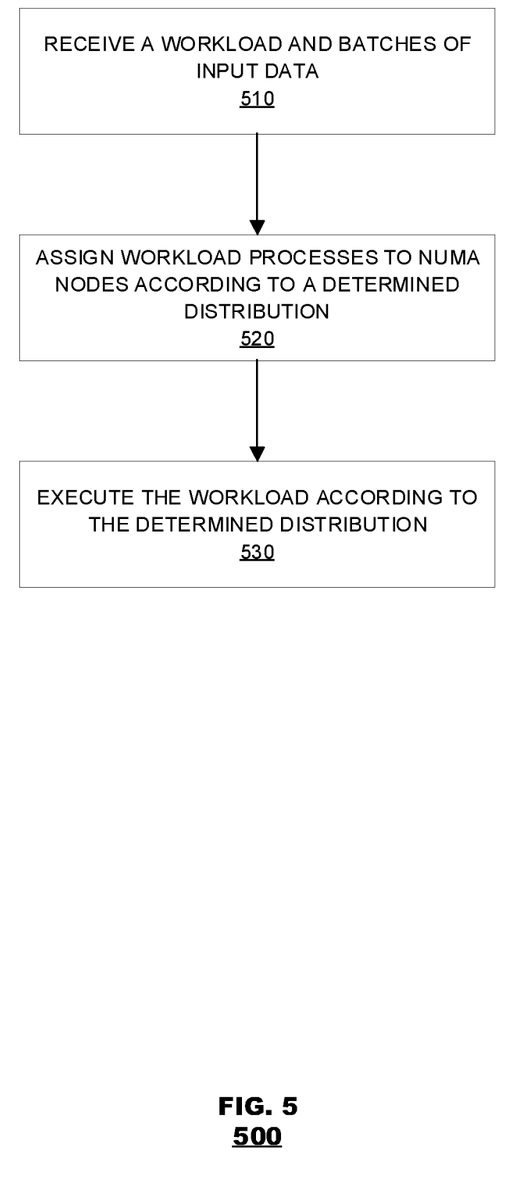
FIG. 5 is a flowchart of an example method for optimal distribution of a workload among nodes of a NUMA architecture, based on which one or more features of the disclosure can be implemented.

FIG. 5 is a flowchart of an example method 500 for the distribution D̂ of a workload among nodes of a NUMA architecture, based on which one or more features of the disclosure can be implemented.

The method 500 may be employed by the processor 110 of FIG. 1 or by a computing unit of the APU 120 of FIG. 1. The method 500 begins, in step 510, by receiving a workload and data batches, the data batches to be processed by the workload. Next, in step 520, workload processes are assigned to the nodes according to a determined distribution. The determined distribution is selected out of a set of distributions so that the execution time of the workload, when executed according to the distribution, is minimal. As mentioned above, for each workload process, i, the determined distribution D comprises, for each node, a respective node configuration $n_i$, a respective portion of the data batches $b_i$, and a respective execution time $t_i$. The node configurations of the determined distribution have to be compatible. And, the execution time of the workload, when executed according to the determined distribution, is a function of the execution times of the determined distribution. Once a distribution has been determined, in step 530, the workload can be executed according to that distribution, that is, each workload process operates on its respective portion of the batches using nodes according to its respective node configuration.

The determined distribution can be determined as described in reference to FIG. 4. Accordingly, a first plurality 450 of time values can be computed, where each time value 480 of the first plurality corresponds to a batch size 460 and a configuration of used nodes 470. A time value of the first plurality of time values records an execution time of a process of the workload when processing the corresponding batch size using the corresponding configuration of used nodes. Next, a second plurality 410 of time values can be computed, wherein each time value 440 of the second plurality of time values corresponds to a batch size 420 and a configuration of blocked nodes 430. A time value in the second plurality of time values records a minimal execution time of one or more processes of the workload when processing respective portions of the corresponding batch size using available nodes. The available nodes can be derived from the corresponding configuration of blocked nodes. As explained above, computing a time value in the second plurality of time values that corresponds to a batch size B can be based on both 1) a precomputed time value in the second plurality of time values that corresponds to a batch size B-b and 2) based on a precomputed time value in the first plurality of time values that corresponds to a batch size b. The determined distribution (step 520) can then be selected as the distribution that is associated with a time value in the second plurality of time values. That time value corresponds to a batch size equal to the workload's batch size and to a configuration of no blocked nodes. For example, for a workload with a batch of size B=256, the determined distribution is the distribution that is associated with X[256][0000]. In an embodiment, the first plurality of time values and the second plurality of time values are represented in a matrix.

It should be understood that many variations are possible based on the disclosure herein. Although features and elements are described above in particular combinations, each feature or element can be used alone without the other features and elements or in various combinations with or without other features and elements.

The methods provided can be implemented in a general-purpose computer, a processor, or a processor core. Suitable processors include, by way of example, a general-purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such as instructions capable of being stored on a computer readable media). The results of such processing can be mask works that are then used in semiconductor manufacturing processes to manufacture processors that implement aspects of the embodiments.

The methods or flowcharts provided herein can be implemented in a computer program, software, or firmware incorporated in a non-transitory computer-readable storage medium for execution by a general-purpose computer or processor. Examples of non-transitory computer-readable media include read only memory (ROM), random-access memory (RAM), a register, cache memory, semiconductor memory devices, magnetic media such as internal hard drive and disks and removable disks, magneto-optical media, and optical media such as CD-ROM disks, and digital versatile disks (DVDs).

What is claimed is:

1. A method for distribution of a workload among nodes of a non-uniform memory access (NUMA) architecture, comprising:

receiving the workload and data batches, the data batches to be processed by the workload;

obtaining a determined distribution based on a graph, wherein each node of the graph has an associated batch size, disjoint set, and execution time, by performing operations including: selecting an initial node of the graph as a current node for a current path; traversing to a new compatible node of the graph for which the total time for the path is less than a current time for the path; and repeating the traversing until a sum of batch sizes of each node in the current path is equal to a number of the data batches;

assigning workload processes to the nodes according to the determined distribution, wherein the determined distribution is selected out of a set of distributions so that execution time of the workload, when executed according to the distribution, is minimal; and executing the workload according to the determined distribution.

2. The method of claim 1, wherein for each workload process, the determined distribution comprises, for each node, a respective node configuration, a respective portion of the data batches, and a respective execution time.

3. The method of claim 2, wherein the respective node configurations of the determined distribution are compatible.

4. The method of claim 2, wherein the execution time of the workload, when executed according to the distribution, is a function of the respective execution times for each of the nodes of the determined distribution.

5. The method of claim 2, wherein the executing the workload according to the determined distribution further comprises:
processing, by each workload process, the respective portion of the data batches using nodes according to the respective node configuration.

6. The method of claim 1, wherein the determining of the distribution further comprises:
computing a first plurality of time values,
wherein each time value in the first plurality of time values corresponds to a batch size and a configuration of used nodes, and the time value records an execution time of a workload process when processing the corresponding batch size using the corresponding configuration of used nodes.

7. The method of claim 6, wherein the determining of the distribution further comprises:
computing a second plurality of time values,
wherein each time value in the second plurality of time values corresponds to a batch size and a configuration of blocked nodes, and the time value records a minimal execution time of one or more workload processes when processing respective portions of the corresponding batch size using available nodes, the available nodes are derived based on the corresponding configuration of blocked nodes.

8. The method of claim 7, wherein computing a time value in the second plurality of time values that corresponds to a first batch size is based on a precomputed time value in the second plurality of time values that corresponds to a second batch size and based on a precomputed time value in the first plurality of time values that corresponds to a third batch size, wherein the first batch size is a sum of the second batch size and the third batch size.

9. The method of claim 7, wherein the determining of the distribution further comprises:
selecting a distribution that is associated with a time value in the second plurality of time values, the time value corresponds to a batch size equal to the size of the batches of the workload and to a configuration of no blocked nodes.

10. The method of claim 1, wherein two graph nodes of the graph are connected if the graph nodes are associated with compatible node configurations.

11. The method of claim 10, wherein:
the current path includes graph nodes of the graph that are associated with respective node configurations that are compatible.

12. A system for distribution of a workload among nodes of a non-uniform memory access (NUMA) architecture, comprising:
at least one processor; and
memory storing instructions that, when executed by the at least one processor, cause the system to:
receive the workload and data batches, the data batches to be processed by the workload,
obtain a determined distribution based on a graph, wherein each node of the graph has an associated batch size, disjoint set, and execution time, by performing operations including: selecting an initial node of the graph as a current node for a current path; traversing to a new compatible node of the graph for which the total time for the path is less than a current time for the path; and repeating the traversing until a sum of batch sizes of each node in the current path is equal to a number of the data batches;
assign workload processes to the nodes according to the determined distribution, wherein the determined distribution is selected out of a set of distributions, so that execution time of the workload, when executed according to the distribution, is minimal, and
execute the workload according to the determined distribution.

13. The system of claim 12, wherein for each workload process, the determined distribution comprises, for each node, a respective node configuration, a respective portion of the batches, and a respective execution time.

14. The system of claim 13, wherein the respective node configurations of the determined distribution are compatible.

15. The system of claim 13, wherein the execution time of the workload, when executed according to the distribution, is a function of the respective execution times for each of the nodes of the determined distribution.

16. The system of claim 12, wherein the executing the workload according to the determined distribution further comprises,
processing, by each workload process, the respective portion of the data batches using nodes according to the respective node configuration.

17. The system of claim 12, wherein the determining of the distribution further comprises:
computing a first plurality of time values,
wherein each time value in the first plurality of time values corresponds to a batch size and a configuration of used nodes, and the time value records an execution time of a workload process when processing the corresponding batch size using the corresponding configuration of used nodes.

18. The system of claim 12, wherein the determining of the distribution further comprises:
computing a second plurality of time values,
wherein each time value in the second plurality of time values corresponds to a batch size and a configuration of blocked nodes, and the time value records a minimal execution time of one or more workload processes when processing respective portions of the corresponding batch size using available nodes, the available nodes are derived based on the corresponding configuration of blocked nodes.

19. The system of claim 18, wherein the determining of the distribution further comprises:
selecting a distribution that is associated with a time value in the second plurality of time values, the time value corresponds to a batch size equal to the size of the batches of the workload and to a configuration of no blocked nodes.

20. A non-transitory computer-readable medium comprising instructions executable by at least one processor to perform a method for optimal distribution of a workload among nodes of a non-uniform memory access (NUMA) architecture, the method comprising:

receiving the workload and data batches, the data batches to be processed by the workload;

obtaining a determined distribution based on a graph, wherein each node of the graph has an associated batch size, disjoint set, and execution time, by performing operations including: selecting an initial node of the graph as a current node for a current path; traversing to a new compatible node of the graph for which the total time for the path is less than a current time for the path; and repeating the traversing until a sum of batch sizes of each node in the current path is equal to a number of the data batches;

assigning workload processes to the nodes according to a determined distribution, wherein the determined distribution is selected out of a set of distributions, so that execution time of the workload, when executed according to the distribution, is minimal; and executing the workload according to the determined distribution.

* * * * *